3,480,393
PRODUCT RECOVERY IN A REVERSIBLE
VAPOR PHASE CHEMICAL EQUILIBRIUM
PROCESS BY MULTIPLE POINT WITH-
DRAWAL DEPRESSURIZATION
Thomas M. Stark, Morristown, and Marvin B. Glaser,
Scotch Plains, N.J., assignors to Esso Research and
Engineering Company, a corporation of Delaware
Filed Jan. 30, 1964, Ser. No. 341,357
Int. Cl. C01c 1/04
U.S. Cl. 23—199                                    10 Claims

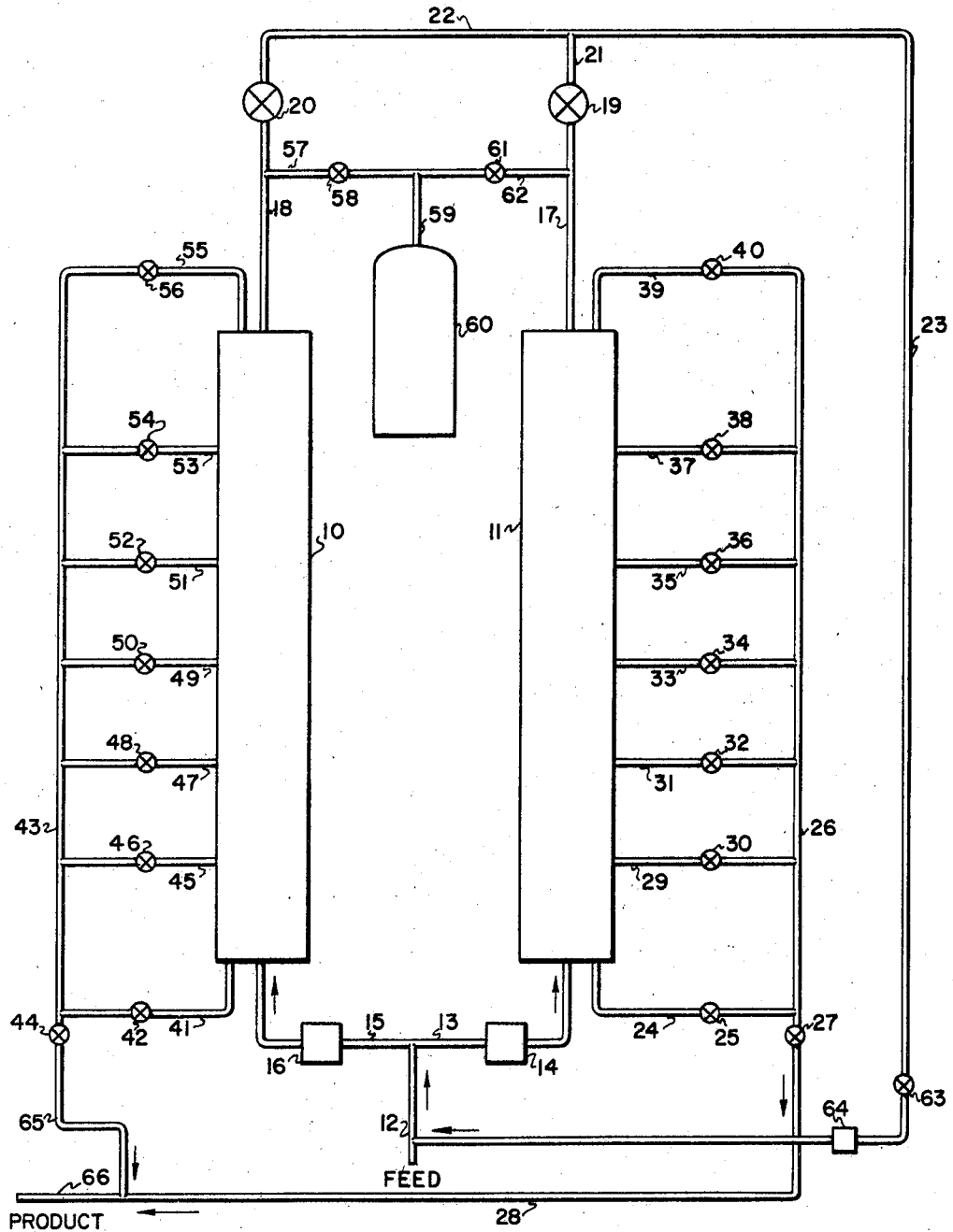
THOMAS M. STARK
MARVIN B. GLASER    Inventors
By David A. Roth
Patent Attorney United States Patent Office 3,480,393
Patented Nov. 25, 1969

ABSTRACT OF THE DISCLOSURE

The yield of product in a reversible vapor phase chemical equilibrium process in which the position of equilibrium has been shifted in favor of the products by adsorption of the product onto a selective adsorbent is improved by utilizing a plurality of withdrawal points to depressurize the sorbent bed, This technique minimizes reaction reversal due to product contact with catalyst.

The present invention is concerned with a method and apparatus for improving the recovery of product in a reversible vapor phase chemical equilibrium process where there has been a net change, e.g. decrease, in the number of reactant and product molecules. In particular, the present invention relates to a method and apparatus for improving product recovery in an equilibruim-limited vapor phase catalytic reaction in which the position of the equilibria has been shifted in favor of the products by adsorption of the product onto a selective adsorbent.

The present invention utilizes as one preferred embodiment the pressure cycling heatless fractionation technique described in U.S. Patent 2,944,627, issued July 12, 1960, entitled "Method and Apparatus for Fractionating Gaseous Mixtures by Adsorption," inventor Charles W. Skarstrom. The invention is particularly concerned with an improved method and apparatus for the manufacture of ammonia by the catalytic reaction of nitrogen and hydrogen.

There are many examples known to the chemical art of reversible gas phase equilibrium reactions in which the total number of molecules change. Such reactions are known either as combination or dissociation reactions depending upon the direction studied.

Examples of such reactions include the combination of sulfur and oxygen to form sulfur trioxide, the combination of nitrogen and hydrogen to form ammonia, the formation of a molecule of halide by combination of the atomic species, the formation of phosphorus pentachloride from phosphorus trichloride and chlorine, and the formation of ammonium chloride by the reaction of ammonia and hydrochloric acid, among many others.

In such reactions, when the numbers of molecules of reactants and products are different, the position of equilibrium is affected by the total pressure although theoretically the value of $K_p$ should of course remain constant.

It follows from the Le Chatelier principle that increase of pressure will tend to force the equilibrium in the direction in which there is a decrease in the number of molecules and the same conclusion is reached from the law of chemical equilibrium.

An examples of such a system is the exothermic formation of ammonia from nitrogen and hydrogen, that is, $N_2 + 3H_2 \rightleftharpoons 2NH_3$. In this example the fraction of nitrogen converted into ammonia is a function of the total pressure. Increase of the total pressure will tend to move the position of equilibrium in the direction of a decrease in the number of molecules, that is, it should favor the formation of ammonia. Furthermore, an increase of temperature will result in a decrease in the yield of ammonia as is to be anticipated since the reaction is exothermic.

In order to produce the maximum conversion of nitrogen into ammonia, it is desirable therefore to work at as low a temperature as is compatible with an appreciable rate of reaction. Therefore, catalysts are employed in order to expedite the process. Such catalytic system are utilized in commercial processes, for example, the "American System" wherein the reaction chamber is at a pressure of about 300 atmospheres and the temperature is about 475° C. In this system the catalyst comprises iron oxide granules containing the combined promoters potassium and aluminum oxide.

Another commercial system is the Haber process in which the pressure is about 200 atmospheres and the temperature is about 550° C. The catalyst in this process is promoted iron as, for example, iron oxide containing small amounts of chromium and cerium. In all cases the feed gases comprise substantially pure nitrogen and hydrogen present in the proper proportions and free of carbon dioxide and other contaminants. However, in the processes described, the conversion is relatively low, generally ranging below 40% and as low as 8%. Therefore, any improvement in the technique which increases the conversion will, of course, result in great material benefits.

One such method for improving the conversion in a catalytic reversible gas phase equilibrium process involves the use of a selective product adsorbent in combination with (or as part of the composition of) the normal catalyst. This method is disclosed in copending, commonly assigned application Ser. No. 344,802, filed Feb. 5, 1964, now U.S. Patent No. 3,282,647, issued Nov. 1, 1966, in the names of Charles W. K. Skarstrom, Richard P. Crowley, and William O. Heilman, the disclosure of which is incorporated herein by reference in its entirety.

The adsorbent acts by removing the product from participation in the equilibrium reaction, i.e., by lowering the product partial pressure. This forces the equilibrium reaction in the direction of forming more product. However, once the adsorbent bed becomes saturated with product, stable equilibrium conditions will be established once more. It will then be necessary to remove the product from the adsorbent bed in order to continue forcing the reaction in the direction of product.

In the pressure cycling operation described in the above-identified U.S. patent, the product may be recovered from the bed by depressuring. This depressuring step has serious drawbacks where the reaction involves a decrease in the total number of mols involved, e.g., the synthesis of ammonia from hydrogen and nitrogen. Depressuring while the product is in contact with catalyst will tend to cause some reversal of the reaction. This is a result of the Le Chatelier principle discussed previously, that is, as the total pressure is lowered, the reaction will shift in the direction of the greater number of molecules, which in the case of the ammonia synthesis would favor the reactants. The result therefore would be an ultimate reduction in the over-all conversion of nitrogen and hydrogen to ammonia.

It is therefore an object of the present invention to provide a method and apparatus for the recovery of product from a reversible chemical equilibrium system in which there has been a net change in the number of molecules of reactants and products without appreciable decomposition of the product. It is a further object to provide a method and apparatus for the recovery of product wherein contact of the product with the catalyst during a depressuring step is minimized. It is a still further object of this invention to effect rapid recovery of product without causing catalyst and adsorbent attrition. Further objects will become readily apparent upon examination of the following discussion.

It has now been found and forms the substance of this invention that the recovery of reaction products from chemical equilibria reactions of the type heretofore described can be improved by the use of multiple point withdrawal during the depressuring step.

Multiple point withdrawal involves the use of a plurality of withdrawal points located along the entire bed length in contrast to the single withdrawal point at one end of the bed known to the art. The withdrawal points additionally can be located around the outside periphery of the bed. The prior method of product withdrawal in Ser. No. 344,802, now U.S. Patent No. 3,282,647, issued Nov. 1, 1966 involved depressuring the bed through one end. This meant that for reactors of a certain geometry a large proportion of product gas had extensive contact time with catalyst under depressuring conditions. The result of product withdrawal in that manner being that extensive decomposition occurred, that is, the product-reactant equilibrium was reversed in favor of the reactant. Shorter contact times were obtainable by increasing the withdrawal velocity; however, this resulted in increased attrition of the bed and catalyst, which was highly undesirable from the economic point of view.

Under the system of the present invention, reaction reversal may be prevented to any appreciable extent by rapidly depressuring the bed through a plurality of withdrawal points located along the length and at the ends of the bed instead of through a single point located at one end. The use of multiple withdrawal points will allow the rapid depressuring of the bed, yet the greater cross-sectional area obtainable due to multiple point withdrawal will result in a low gas velocity in the bed which therefore yields a minimized rate of catalyst and adsorbent attrition. It should be noted that the total cross-sectional area of the multiple point withdrawal system is substantially greater than that of the largest practical valve used in a one end depressuring system.

The withdrawal points are placed so that the amount of gas flowing through each is approximately the same so as to minimize the over-all bed attrition. The number of such points and the velocity through each will be determined by the kinetics of the particular reaction and also the physical properties of the particular bed employed. In order to prevent substantial reverse reaction in the ammonia synthesis, it is desired that the bed be depressured in the time range between 1 to 60 seconds, preferably 5 to 30 seconds. The system of the present invention operates as follows:

A feed stream consisting of a mixture of reactant gases, for example, nitrogen and hydrogen, is introduced into the bottom of a reactor vessel at a pressure of about 10 to 200 atmospheres. The reactor is maintained at the reaction conditions, e.g., 650 to 1300° F., preferably 750 to 1050° F., and 10 to 200 atmospheres, preferably 20 to 100 atmospheres. Unreacted feed and some product is withdrawn from the top of the reactor. At the end of the cycle when the adsorbent material, e.g., a synthetic or natural zeolite molecular sieve; alumina, silica gel, activated charcoal, or other adsorbent known to the art, preferably a synthetic zeolite, has adsorbed at least some product, the feed and product lines are closed off. The reactor vessel is depressured, thereby causing the void gas and adsorbed product to be rapidly withdrawn from the reactor. This is accomplished through a plurality of withdrawal lines located along the entire length of the reactor, preferably perpendicular to the lateral length of the reactor vessel. Optionally, then the withdrawal points can also be placed at the ends of the reactor. The withdrawal points are spaced along the length of the reactor in such a manner that the velocity of gas flowing through the bed to each point is low enough to avoid catalyst or adsorbent attrition, yet gas removal will be rapid enough to avoid appreciable reverse reaction.

The multiple point withdrawal technique of the invention also has the advantage of adding flexibility into the system. For instance, it would be possible to depressurize through the withdrawal points and segregate the product obtained from each of said points or selected group of points. Thus, if there were any product gradient along the adsorbent bed, it would be possible to fractionate those sections having desirable gradients from those sections having undesirable ones. This would result in a product stream having a higher purity than hitherto possible.

The present invention may be more fully understood by reference to the attached drawing which illustrates a preferred embodiment of the same:

The figure illustrates a system for carrying out chemical reactions by the pressure cycling technique wherein the product is recovered by the use of a multiple point withdrawal system. The specific embodiment depicted herein is especially suitable for the manufacture of ammonia from nitrogen and hydrogen gas streams.

Referring specifically to the figure, numerals 10 and 11 designate a pair of reaction vessels. For simplicity, these vessels are shown in a diagrammatical form, but it is to be understood that these vessels may comprise conventional reaction vessels such as those utilized in the production of ammonia as described in "Industrial Chemistry" by Riegel, Third edition, published by Reinhold Publishing Corporation, 330 West 44 Street, New York, 1937, page 118. Vessels 10 and 11 may also comprise other types of converters now used in the art.

Each vessel is adapted to contain a fixed bed comprising a catalyst for the specific chemical reaction being run and adsorbent material selective for the product either separately or in combination with the catalyst. The combined adsorbent catalyst particles are substantially uniformly mixed with each other to result in a substantially homogeneous adsorbent-catalyst packing for the reactors.

For the specific embodiment involving the synthesis of ammonia, the catalyst is promoted iron granules known to the art to be satisfactory for the production of ammonia from nitrogen and hydrogen. The adsorbent material is one having a preferential selectivity for ammonia as compared to nitrogen and hydrogen. In this particular embodiment, it is a synthetic zeolite having an average pore diameter greater than about 4 A.

The feed gas, comprising nitrogen and hydrogen preferably in the correct proportion, e.g., 1 mol nitrogen to 3 mols hydrogen, is introduced into zone 10 by means of lines 12 and 15. This feed gas passes through an open solenoid operated valve 16 and is introduced into the bottom of zone 10. The temperature in zone 10 is in the range from about 650 to 1300° F., preferably between about 750–1050° F., while the pressure is in the range of about 10 to 200 atm., preferably 20–100 atmospheres.

The feed gas, e.g. the nitrogen and hydrogen mixture, will react when placed in contact with the catalyst in the bed to form ammonia. The ammonia so formed will be preferentially adsorbed by the adsorbent material which as pointed out above, is homogeneously dispersed with the catalyst throughout the reaction bed.

As the reaction continues with the additional introduction of feed gas, that part of the adsorbent material located in and about the feed inlet point will adsorb product ammonia. This forms an adsorption front which will then proceed upwardly along the length of reaction vessel 10.

Gases, consisting of unreacted nitrogen and hydrogen as well as some NH₃ product are removed from the top of zone 10 by means of line 18. These gases flow through valve 20 through lines 22 and 23 and are recycled by introduction into feed line 12. Valve 63 controls this recycle operation and representing means 64, e.g., a compresser, is used to bring the recycle gas pressure up to the level of the feed stream pressure.

Additionally, a portion of the exhaust gas stream may be segregated by means of line 57, valve 58 which is opened during this operation, and line 59 which communicates with purge tank 60. Gas segregated in tank 60 can be used to either purge vessel 10 or repressure vessel 10 after the product removal step has been completed. It should be noted that while vessel 10 is on the reaction cycle, valves 14, 19 and 61 are in the closed position. Finally, when the reaction cycle is ended valves 20, 16 and 58 are closed.

If valve 44 is opened manifold 43 reaches the desired desorption pressure, e.g., 1–2 atm. Manifold 43 communicates with a series of multiple withdrawal lines 41, 45, 47, 49, 51, 53 and 55. These lines are placed at selectable intervals along the length and at the ends of vessel 10. They need not be lined up with each other and more or less lines can be used if desired. Product removal directly from the reactor is accomplished by opening valves 42, 46, 48, 50, 52, 54 and 56. These valves can be controlled to open with valve 44 or they can be left open; or they can be opened selectively according to the particular reaction conditions. This brings the pressure in vessel 10 down to the desorption pressure rapidly and uniformly. Product and unreacted components flow directly out of reactor 10 through the withdrawal lines. After the product is removed from this stream, the remainder can be recycled to feed.

In the specific embodiment depicted in the figure, vessel 10 has a length of 80 feet and a radius of 8½ feet. The bed within vessel 10 contains 2000 cubic feet of material comprising 70 to 90% of adsorbent, e.g. a synthetic zeolite or other adsorbent described previously and 30 to 10% of an ammonia synthesis catalyst, such as promoted iron granules, which catalyst is preferably homogeneously dispersed throughout the adsorbent material. Multiple withdawal lines 41, 45, 47, 49, 51 and 53 are uniformly spaced 8 feet apart along the periphery of vessel 10.

Each withdrawal line is equipped with an outlet end which is adapted to allow passage of the gas through the line but which will effectively screen out the adsorbent material and the catalyst. A suitable adaptation for this purpose would consist of a fine wire screen over the outlet end, which screen is made of material such as a metal which would be unaffected by the reaction conditions. The product gas, e.g. ammonia, is collected from the respective withdrawal lines via manifold 43. This product gas is then collected for further purification or storage by means of lines 65 and 66.

When the desorption process has been completed and the product removed from zone 10 by means of the multiple point withdrawal system, manifold valve 44 and withdrawal point valves 42, 46, 48, 50, 52, 54 and 56 are closed. Valve 58 is open and a portion of the collected synthesis gas is removed from tank 60. This gas is utilized to backwash vessel 10. Such a backwash is most desirable when the type of reaction involved includes the formation of a large amount of side products which are not readily desorbable from the adsorbent catalyst mixture. The backwash mixture is passed out through valve 16 which is open during this operation. The side product-backwash stream may then be eliminated from the system by conventional means not shown.

It will be understood that the backwash or purge by the effluent gas can also be carried out through the multiple point withdrawal lines. Moreover, backwash purge can be carried out with a portion of the overhead effluent from the other reactor while it is on adsorption.

Also, there are numerous situations where the working capacity of the adsorbent used between the high pressure and low pressure of the cycle will be great enough to prevent elimination of the backwash (purge) step altogether if desired.

Vessel 10 may be repressured to synthesis conditions in one of two ways. In one method, valve 16 would be shut upon the completion of the backwash step and synthesis gas would be led from tank 60 by means of open valve 58 until tank 60 and vessel 10 had equalized in pressure. Then, valve 16 would be opened, completing the repressuring with fresh feed gas. On the other hand, valve 58 may be shut and valve 16 opened to allow synthesis gas to enter from feed line 12 by means of line 15 so as to repressure the vessel. The entire cycle is then repeated as hereinbefore disclosed.

While vessel 10 is on the depressuring and backwashing cycles, vessel 11 is on the reaction cycle. The feed or synthesis gas is introduced into zone 11 by means of lines 12 and 13. This feed gas passes through an open solenoid operated valve 14 and is introduced into the bottom of zone 11. The reaction conditions in zone 11 are maintained as described previously for zone 10. The feed gas, e.g., nitrogen and hydrogen mixture, will react when placed in contact with the catalyst in the bed of vessel 11 to form product, e.g. ammonia. The ammonia so formed will be preferentially adsorbed by the adsorbent material as described for vessel 10. Similarly, as the reaction continues with the additional introduction of feed gas, that part of the adsorbent material located in and about the feed inlet point of vessel 11 will adsorb the ammonia product. This forms an adsorbent front which will then proceed upwardly along the length of reactor vessel 11.

Gases, consisting almost essentially of unreacted nitrogen and hydrogen, are removed from the top of zone 11 by means of line 17. These gases flow through valve 19 through lines 21 and 23 and are recycled by introduction into feed line 12. Additionally, a portion of this exhaust gas stream may be segregated by means of line 62, valve 61 which is open during this operation, and line 59 which communicates with purge tank 60. It should be noted that while vessel 11 is on the reaction cycle, valves 16, 20, and 58 are in the closed position.

When the product adsorption zone in vessel 11 has approached, or achieved saturation as determined by conventional detecting means not shown, valves 14, 61 and check valve 19 are closed.

Product is finally removed from the system by opening valve 27, thereby allowing manifold 26 to reach the desired desorption pressure, e.g., 1–2 atm. Manifold 26 communicates with a series of multiple withdrawal lines 24, 29, 31, 33, 35, 37 and 39. These lines are placed at selectable intervals along the length of the vessel 11. Product removal directly from reactor 11 is accomplished by opening valves 25, 30, 32, 34, 36, 38 and 40. This brings the pressure in vessel 11 down to desorption pressure rapidly and uniformly. The product gas, e.g., ammonia, is collected from the respective withdrawal lines via manifold 26. This product gas is then collected for further purification or storage by means of lines 28 and 66.

The physical dimensions of vessel 11 and its multiple point withdrawal system are preferably identical to those of vessel 10 and its multiple point withdrawal system. In essence, the apparatus described in the figure comprises two catalyst-adsorbent mixture beds which are alternatively connected to the high pressure feed. While one bed is at a relatively high pressure, the other bed is reduced to a relatively low pressure, backwashed with some of the unreacted gases and brought back up to reaction pressure. It is to be understood that the bed may be brought up to reaction pressure either by utilizing collected unreacted gases introduced at the product end of the vessel, or alternatively, it may be repressured with synthesis or feed gas introduced at the feed end of the vessel.

By operating in the manner heretofore described, it is possible to obtain conversions of nitrogen and hydrogen to ammonia higher than the normal equilibrium and as high as 90%. The use of a pressure cycle system involving two beds operated at diametrically opposed phases, results in the continuous production of product ammonia. The time of the cycle will vary appreciably and will depend upon the particular catalyst being used, the adsorbent material being used, as well as the pressures and temperatures utilized. However, in general, it is preferred that the time of the cycle be below 10 minutes and preferably in the range of from about ½ minute to 4 minutes.

While the multiple point withdrawal system of the present invention has been described with some particularity in conjunction with a two-bed, pressure cycle synthesis system, it should be emphasized that such a multiple point withdrawal system may also be utilized with advantage in other synthesis systems known to the art. For example, the multiple point withdrawal system may be employed in conjunction with a single fixed bed reaction vessel operating under pressure cycle conditions.

Experiments were conducted comparing the effectiveness of single fixed bed reaction vessels with and without a multiple withdrawal system in the synthesis of ammonia from nitrogen and hydrogen as measured by the amount of conversion to ammonia. The results are tabulated in Table I given below:

TABLE I

Ammonia conversion in a 30 cc. bomb utilizing a 3/1 $H_2/N_2$ feed stream at 842° F. and 100 Atm.

| Run | Conditions | Conversion (theory=2%), percent |
|---|---|---|
| I | 5 cc. Fe catalyst (reduced), 17.5 cc. inerts. | 25 |
| II | 5 cc. Fe catalyst (reduced), 2.5 cc. 2.5 cc. inerts 15 cc. adsorbent (5 A. molecular sieve). Reaction quenched by placing vessel in $H_2O$ to prevent reverse reaction. | 59 |
| III | 5 cc. Fe catalyst (reduced) 2.5 cc. inerts, 15 cc. adsorbent (5 A. molecular sieve). Depressured rapidly 5-30 seconds. | 61 |

The data shows the advantage gained by using a rapid depressurizing system in conjunction with an adsorbent bed to improve ammonia conversion. Run I was a blank experiment and showed that the reaction was running very close to the theoretical limit. Introduction of a molecular sieve adsorbent increased the conversion to about 200% of theory when measured following a water quench to stop the reaction. In run III, rapid depressuring was used to remove the product from the reaction bomb. The conversion obtained compared favorably with that of the water quenched run II which shows that rapid depressuring will effectively prevent reaction reversal.

Still other useful embodiments of the present invention will suggest themselves to one skilled in the art from the discussion contained herein. As indicated previously, the present invention may be successfully utilized generally to improve the recovery of product in a reversible, catalytic chemical equilibrium process wherein adsorbent is utilized to shift the equilibrium in favor of the product.

What is claimed is:

1. An improved method for recovering the product in a reversible vapor phase chemical equilibrium process in which the position of equilibrium has been shifted in favor of the products by pressurization and adsorption of the product onto a selective adsorbent comprising:
   (a) contacting a reaction stream comprising at least one reacting component with catalyst in a reaction zone at reaction conditions of temperature and pressure whereby product is formed, wherein said reaction stream flows along the direction of the lateral length of said reaction zone;
   (b) adsorbing said product onto a selective adsorbent within said reaction zone at said reaction conditions whereby the said reversible reaction is driven in favor of said product; and
   (c) depressurizing the reaction zone and removing the product from the reaction zone by withdrawing said product through a plurality of withdrawal points located along the lateral length of said reaction zone at a pressure substantially below that of the reaction pressure in a time sufficiently short to avoid appreciable reaction reversal.

2. The method of claim 1 wherein said catalyst and said adsorbent are intimately co-mixed.

3. An improved method for the manufacture of ammonia by the reaction of nitrogen and hydrogen gas comprising:
   (a) contacting a reaction stream comprising nitrogen and hydrogen gas with catalyst in a reaction zone at ammonia synthesis conditions of temperature and pressure whereby ammonia is reversibly formed as product, wherein said reaction stream flows along the direction of the lateral length of said reaction zone;
   (b) adsorbing said ammonia onto a selective adsorbent within said reaction zone at said synthesis conditions whereby the said reaction is driven in favor of the product ammonia; and
   (c) depressurizing the reaction zone and removing the product from the reaction zone by withdrawing said product through a plurality of withdrawal points located along the lateral length of said reaction zone at a pressure substantially below that of the reaction pressure in a time sufficiently short to avoid appreciable reaction reversal.

4. The method of claim 3 wherein said synthesis conditions comprise a temperature in the range between 650° F. and 1300° F. and a pressure in the range between 10 atm. and 200 atm.

5. The method of claim 3 wherein said catalyst comprises promoted iron granules.

6. The method of claim 3 wherein said selective adsorbent comprises a synthetic zeolite.

7. The method of claim 3 wherein said catalyst and said selective adsorbent are intimately co-mixed.

8. An improved method for the manufacture of ammonia by the reaction of nitrogen and hydrogen gas comprising:
   (a) contacting a reaction stream comprising nitrogen and hydrogen gas in the respective molar ratios of about ⅓ with a promoted iron granule catalyst in a reaction zone at a temperature in the range between 750 and 1,050° F. and a pressure in the range between 20 and 100 atm. whereby ammonia is reversibly formed as product wherein said reaction stream flows along the direction of the lateral length of said reaction zone;
   (b) adsorbing said ammonia onto a synthetic zeolite adsobent at reaction conditions within said reaction zone which adsorbent is intimately co-mixed with said catalyst whereby the said reaction is driven in favor of the product ammonia; and
   (c) depressurizing the reaction zone and removing the product from the reaction zone by withdrawing said product through a plurality of withdrawal points located along the lateral length of said reaction zone at a pressure in the range between 1 to 2 atm., the removal time being in the range between 1 and 60 seconds thereby avoiding appreciable reaction reversal.

9. The method of claim 8 wherein said removal time is in the range between 5 and 30 seconds.

10. In an improved method for conducting vapor phase catalytic reversible reactions under pressure wherein the product is adsorbed onto a selective adsorbent comprising:
   (a) contacting a pressurized gaseous reaction mixture with catalyst in a reaction zone at reaction conditions of temperature and pressure whereby product is formed;

(b) adsorbing the product onto a selective adsorbent within the reaction zone at the reaction conditions whereby the reversible reaction is driven in favor of the product; and
(c) removing the product from the adsorbent and the reaction zone by depressurizing the reaction zone; the improvement therein comprising depressurizing the reaction zone by removing said product through a plurality of reaction zone withdrawal points located along the reaction zone in a time sufficiently short to avoid appreciable reaction reversal.

References Cited

UNITED STATES PATENTS

| | | | |
|---|---|---|---|
| 1,931,678 | 10/1933 | Porter | 23—199 |
| 2,944,627 | 7/1960 | Skarstrom | 55—33 |

OSCAR R. VERTIZ, Primary Examiner

HOKE S. MILLER, Assistant Examiner

U.S. Cl. X.R.

23—1, 288; 55—33